(12) United States Patent
Li et al.

(10) Patent No.: US 12,531,833 B2
(45) Date of Patent: Jan. 20, 2026

(54) ENCODING AND DECODING METHOD AND SYSTEM FOR ROUTE ORIGIN AUTHORIZATION (ROA)

(71) Applicant: COMPUTER NETWORK INFORMATION CENTER, CHINESE ACADEMY OF SCIENCES, Beijing (CN)

(72) Inventors: Yanbiao Li, Beijing (CN); Gaogang Xie, Beijing (CN); Hui Zou, Beijing (CN); Yuxuan Chen, Beijing (CN); Yinbo Xu, Beijing (CN); Zhuoran Ma, Beijing (CN)

(73) Assignee: Computer Network Information Center, Chinese Academy of Sciences, Beijing (CN)

( * ) Notice: Subject to any disclaimer, the term of this patent is extended or adjusted under 35 U.S.C. 154(b) by 318 days.

(21) Appl. No.: 18/263,166

(22) PCT Filed: Apr. 22, 2022

(86) PCT No.: PCT/CN2022/088557
§ 371 (c)(1),
(2) Date: Jul. 27, 2023

(87) PCT Pub. No.: WO2023/040263
PCT Pub. Date: Mar. 23, 2023

(65) Prior Publication Data
US 2024/0089236 A1    Mar. 14, 2024

(30) Foreign Application Priority Data
Sep. 15, 2021   (CN) .......................... 202111081544.1

(51) Int. Cl.
*H04L 9/40*        (2022.01)
*H04L 45/748*      (2022.01)

(52) U.S. Cl.
CPC ........ *H04L 63/0236* (2013.01); *H04L 45/748* (2013.01); *H04L 63/0263* (2013.01)

(58) Field of Classification Search
None
See application file for complete search history.

(56) References Cited

U.S. PATENT DOCUMENTS

| 8,923,298 B2 * | 12/2014 | Wang ..................... H04L 45/748 370/395.32 |
| 2014/0003436 A1 * | 1/2014 | Wang ................ H04L 45/74591 370/392 |

(Continued)

FOREIGN PATENT DOCUMENTS

| CN | 104283567 A | 1/2015 |
| CN | 112003959 A | 11/2020 |

(Continued)

OTHER PUBLICATIONS

International Search Report (PCT/ISA/210) with English translation, and Written Opinion (PCT/ISA/237) mailed on Jun. 27, 2022, by the China National Intellectual Property Administration as the International Searching Authority for International Application No. PCT/CN2022/088557.

Primary Examiner — Scott B Christensen
(74) Attorney, Agent, or Firm — Buchanan Ingersoll & Rooney PC (57) ABSTRACT

Described are an encoding method and system for ROAs. The encoding method includes the following steps: given a set of authorized IP prefixes an AS which are maintained with an IP address trie. By specifying a sequence of hanging levels on the IP address trie, it is divided into a set of non-overlapping sub-trees, each rooted at a hanging level. A node on a hanging level uniquely defines a sub-tree rooted at it, whose prefix can be encoded as the identifier of this sub-tree. All authorized prefixes covered by a sub-tree can (Continued)

be encoded into a bitmap of $2^h$ bits, where h is the height of this sub-tree. Thus, the set of authorized IP prefixes of an AS is encoded into several tuples (identifier, bitmap).

10 Claims, 5 Drawing Sheets

(56) References Cited

U.S. PATENT DOCUMENTS

| | | | |
|---|---|---|---|
| 2017/0366457 A1* | 12/2017 | Wang | H04L 45/745 |
| 2021/0160067 A1 | 5/2021 | Liu et al. | |
| 2022/0116417 A1* | 4/2022 | Compton | H04L 63/1416 |
| 2023/0042307 A1* | 2/2023 | Milton | H04L 61/5076 |
| 2024/0137338 A1* | 4/2024 | Qu | H04L 63/0236 |

FOREIGN PATENT DOCUMENTS

| | | |
|---|---|---|
| CN | 113395208 A | 9/2021 |
| CN | 113794724 A | 12/2021 |

* cited by examiner

Fig. 1

PRIOR ART

Fig. 2

PRIOR ART

```
RouteOriginAttestation ::= SEQUENCE{
        version INTEGER DEFAULT 0,
        asID INTEGER,
        ipAddrBlocks SEQUENCE OF ROAIPAddressFamily
        }

ROAIPAddressFamily ::= SEQUENCE{
        addressFamily OCTET STRING,
        subtreeBlocks SEQUENCE OF SubTreeBlock
        }

SubTreeBlock ::= SEQUENCE{
        id Identifier,
        bm Bitmap
        }

Identifier ::= BIT STRING
Bitmap ::= INTEGER
```

Fig. 3

```
+---------+--------+-------------------+
|protocol|  PDU   |     reserved      |
| version|  type  |      (zero)       |
+---------+--------+-------------------+
|             Length=20                |
+--------------------------------------+
|             Identifier               |
+--------------------------------------+
|              Bitmap                  |
+--------------------------------------+
|       Autonomous System Number       |
+--------------------------------------+
```

Fig. 4

```
+---------------+------+-----------------+
|protocol| PDU  |    reserved     |
| version| type |     (zero)      |
+---------------+------+-----------------+
|              Length=32                 |
+----------------------------------------+
|                                        |
+---+                                +---+
|                                        |
+---+          Identifier            +---+
|                                        |
+---+                                +---+
|                                        |
+----------------------------------------+
|                 Bitmap                 |
+----------------------------------------+
|         Autonomous System Number       |
+----------------------------------------+
```

ENCODING AND DECODING METHOD AND SYSTEM FOR ROUTE ORIGIN AUTHORIZATION (ROA)

The application claims priority to Chinese Patent Application No. 202111081544.1, entitled "An Encoding and Decoding Method and System for Route Origin Authorization (ROA)" filed with the State Intellectual Property Office of China on Sep. 15, 2021, the entire contents of which are hereby incorporated by reference.

TECHNICAL FIELD

The application relates to the technical field of information processing, in particular to an encoding and decoding method and system for ROA.

BACKGROUND ART

The Border Gateway Protocol (BGP) is not well designed in terms of security, thus being vulnerable to abnormal routing attacks. In view of the security problem of BGP, the Resource Public Key Infrastructure (RPKI) is designed, whose basic idea is to build a Public Key Infrastructure (PKI) to cryptographically certify the ownership and usufruct of Internet Number Resources (INRs), such as IP resources (IP address prefix) and AS resources (AS number).

Figure 1:
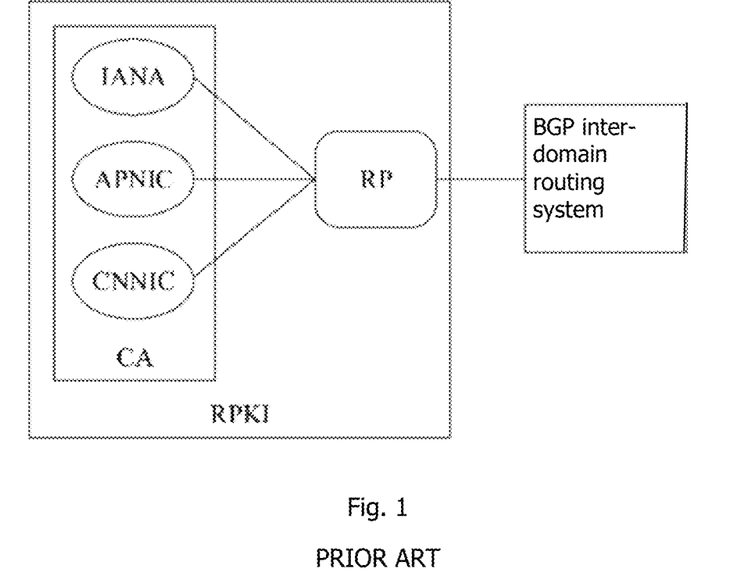
FIG. 1 is a diagram of the RPKI architecture.

FIG. 1 is a diagram of the RPKI architecture. As shown in FIG. 1, the RPKI mainly comprises three major kinds of entities, i.e., a Certification Authority (CA), a Relying Party (RP) and a BGP router. The CA is responsible for resource allocation, and also issuing corresponding resource certificates to subordinate CAs to authenticate a specific resource allocation relationship. After legally holding resources, the CA may continue to issue a Route Origin Authorization (ROA), to legally authorize IP resources to one or more autonomous systems for advertising in the inter-domain routing system. An RP system downloads all resource certificates and signed objects from the RPKI repository via the rsync/RPKI Repository Delta Protocol (RRDP), and keeps them as local copies, which need to be updated regularly. The RP will validate these local RPKI objects, so as to obtain the valid authorization relationship (i.e., <IP-prefix, maxLength, ASN> mapping) between IP prefixes and AS Numbers (ASNs), and store them in a local cache. The BGP router may select one or more RPs it trusts and establishes and keeps connections with them. A BGP router downloads <IP-prefix, maxLength, ASN> mappings from RP(s) based on the RPKI-to-Router (RTR) protocol, and verifies the legitimacy of an originating AS in each BGP route, so as to detect and prevent route hijacking attacks.

Figure 2:
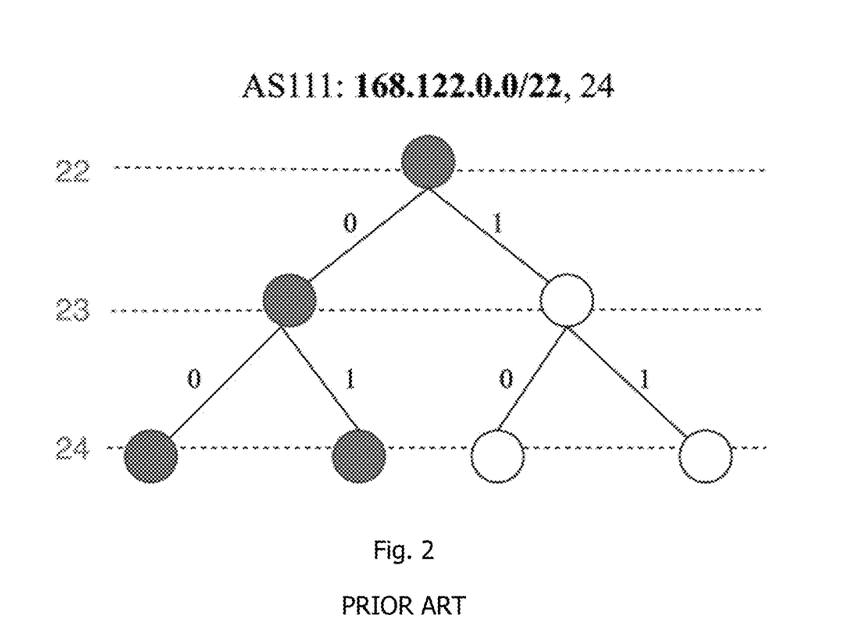
FIG. 2 is a diagram of a loose ROA.

In an ROA, the setting of the maxLength field gives the CA great flexibility in authorizing IP prefixes, and can endorse IP prefixes that are needed in the future "in advance". In this way, when sub-prefixes are needed (for example, to deploy traffic engineering), there is no need to apply for authorization temporarily. However, authorizing IP prefixes in advance provides the opportunity for attackers to perform forged-origin sub-prefix hijacking attacks, which brings serious security risks. As shown in FIG. 2, IP prefixes 168.122.2.0/24 and 168.122.3.0/24 have been authorized and authenticated by the ROA, but are not actually advertised in the inter-domain routing system (indicated as white dots). Therefore, attackers may exploit this vulnerability to launch a forged-origin sub-prefix hijacking attack. To solve this problem, the latest approach recommends to keep the minimal ROA principle whenever possible, that only those prefixes actually authorized to advertise with BGP are encoded with ROAs. However, this will lead to the increase of the number and size of ROAs, and then bring high overheads of computation, transmission and validation to RPs. Particularly, the BGP router needs to process more RTR Protocol Data Units (PDUs) when obtaining ROAs from RP(s), and these overheads will continue to increase at high speed with the deployment of the RPKI, thus reducing the scalability of the RPKI.

The effect of RPKI and ROA in guaranteeing BGP routing security can only be embodied after large-scale deployment. Therefore, an ROA encoding scheme with strong security and high scalability is the key technical bottleneck to be solved urgently to accelerate RPKI deployment and ensure BGP routing security.

SUMMARY OF THE INVENTION

In a first aspect, the application provides an encoding method for ROAs, which comprises: obtaining a set of IP prefixes, the set of IP prefixes comprising at least one IP prefix authorized to an AS; determining a ROA of the AS according to the at least one IP prefix, the ROA comprising a tuple (identifier, bitmap), wherein an IP address trie is used to maintain the at least one IP prefix, the at least one IP prefix respectively corresponds to root nodes of at least one sub-tree block of the IP address trie, the sub-tree blocks do not overlap with one another and are each uniquely determined by the position of its root node in the IP address trie, the identifiers represents the path from the root nodes of the at least one sub-tree block to the root node of the IP address trie, the bitmap represents authorized status of the nodes of the at least one sub-tree block, and encoding of a valid bit indicates that a root node of a sub-tree block corresponding to the valid bit is an authorized node; and sending the ROA.

In another aspect, the application provides a decoding method for ROAs, and the method for decoding a sub-tree block comprises: obtaining an ROA object which contains at least one sub-tree block represented by a tuple of identifier and bitmap, wherein the at least one sub-tree block refers to sub-tree blocks of an IP address trie which do not overlap with one another and are each uniquely determined by the position of its root node in the IP address trie, the identifiers represent the path from the root nodes of the at least one sub-tree block to the root node of the IP address trie, the bitmaps represent authorized status of the nodes of the IP address trie including the nodes of the at least one sub-tree block, and the encoding of at least one valid bit of the bitmap indicating that a root node of a sub-tree block corresponding to the valid bit is an authorized node; extracting at least one tuple of identifier and bitmap from the ROA object; and decoding at least one IP prefix according to the at least one tuple of identifier and bitmap, the number of the at least one IP prefix is determined by the number of authorized nodes in the bitmap, wherein the at least one IP prefix respectively corresponds to the root nodes of the at least one sub-tree block of the IP address trie.

The application not only achieves strong security like minimal ROA, but also breaks through the scalability bottleneck, realizing the secure and scalable encoding scheme for ROAs.

DETAILED DESCRIPTION OF THE INVENTION

The application will be further described in detail with reference to the drawings and specific embodiments.

The purpose of this application is to design a bitmap-based encoding scheme for ROAs by extending formats of the ROA and the RTR payload PDU to support the integration of this encoding scheme in existing RPKI system and protocols. The application not only achieves strong security like minimal ROA, but also improves system scalability, realizing secure and scalable encoding scheme for ROAs. The content of this application will be introduced in three parts below: (1) the bitmap-based encoding method for ROAs; (2) the bitmap-based decoding method for ROAs; and (3) the Sub-Tree Map (STM)-based maintenance method for ROAs.

1. Bitmap-Based Encoding Method for ROAs

Given a set of authorized IP prefixes of an Autonomous System (AS) (assuming that IP prefixes are of the same type, for example, IPv4 prefix or IPv6 prefix), an IP prefix tree (essentially a binary tree) may be used to maintain these IP prefixes. On this tree, each IP prefix uniquely corresponds to a node in the tree, and the IP prefix is determined by a path from the root node of the IP address trie to this node. This application aims to divide the IP address trie into a plurality of independent sub-tree blocks which do not overlap with one another, and each sub-tree block can be uniquely determined by the position of its root node in the IP address trie. Each sub-tree block is encoded as a tuple (identifier, bitmap). While the prefix represented by the root of the subtree block is encoded as its identifier and calculated as an integer, and the bitmap is the authorization status encoding information for all nodes (its corresponding IP prefixes) in the sub-tree block. In this way, the set of authorized IP prefixes of the given AS can be encoded into a list of tuples (identifier, bitmap).

It should be noted that the encoding function of the scheme of the application may be implemented in CA software or RP software. For CA software, it should encapsulate multiple sub-tree blocks into an ROA similar to a traditional scheme of encapsulating multiple ipAddrBlocks in one ROA object. For RP software, it only encapsulate one sub-tree block into an RTR payload PDU. The division, encoding and maintenance of the sub-tree block are introduced below.

1. Sub-Tree Block Division

Give an IP address trie (for example, the IP prefix trie with height 33 and 129 for IPv4 and IPv6 respectively, and the height is numbered from 0). The application defines a "hanging level" as the basis of dividing sub-tree blocks. The root node of each sub-tree block is located on a hanging level, while a leaf node extends to an upper level of a next hanging level. When the hanging level is a $30^{th}$ level, the leaf node is a last level of the IP address trie. In this way, as long as a dividing scheme of the hanging level is given, the division of the sub-tree block can be uniquely determined. In one example, the hanging level is set to be, for example, a multiple of 5 according to the scheme of the invention, i.e., the $0^{th}$ level, the $5^{th}$ level and so on. In this way, the number of nodes in each sub-tree block is $2^5-1=31$ (except sub-tree blocks with their root nodes hanged on the $30^{th}$ level). In the above sub-tree block, each node uniquely represents or defines an IP prefix. If the IP prefix corresponding to a node is an authorized prefix, the node is called an authorized node. According to this method, a set of IP prefixes with a given AS can be divided into several sub-tree blocks which contain authorized nodes and do not overlap with one another.

2. Encoding of a Sub-Tree Block

Give a sub-tree block X of the IP address trie, which IP address trie has a root. Assuming that an assigned node of the block X represents or corresponds to an IP prefix of x/y (x represents the IP address and y represents the prefix length), the scheme uses the y valid bits of the IP prefix to encode as both an identifier and a bitmap, wherein the identifier represents the distance between the sub-tree block the assigned node belongs to and the root, and the bitmap represent that among the sub-tree block X, which node has been authorized. In an example, a lower-bit encoding scheme is adopted, that is, lower y bits in the binary representation of the x are chosen.

With regard to the identifier, the first m bits of the IP address x are encoded as the identifier, wherein m is the interval of or distance between the hanging levels of the IP address trie. In an example, a m+1 identifier is obtained by concatenating a set bit (the most significant bit and set to 1) and the first m bits of this prefix. It can be proved that this identifier is unique, that is, any two different sub-tree blocks must have different identifiers calculated according to the above scheme. The process of proof is not provided here.

With regard to bitmap, based on the remaining y-m bits of the y bits (except the lower m bits), the node number of the assigned node among the sub-tree X can be determined, from which a bit of the bitmap (associated with the sub-tree X) is set, to represent that there is an authorized node of the sub-tree X.

By numbering all tree nodes from 1 and following the level order traversal, every node can locate one bit of the bitmap using its node number as the index, starting from the bit next to the least significant bit (LSB). In this bitmap, the LSB encodes with the withdrawal flag which is used to indicate whether the authorization of all authorized prefixes covered by this sub-tree block should be withdrawn, and by default is 0. Each of the rest bits represents an identical node of this sub-tree, and any bit of the bitmap is set if and only if its corresponding node of the sub-tree represents an authorized prefix.

3. Maintenance of Sub-Tree Blocks

The application introduces Sub-Tree Map (STM), a hash table keyed by the sub-tree identifier, to maintain a list of sub-tree blocks that produced with encoding scheme for a given set of authorized prefixes of an AS. There are two STMs for each AS, and are used for announcements and withdrawals.

Every sub-tree block is inserted into the STM corresponding to its withdrawal flag, and if the withdrawal flag of this sub-tree block is set, it should be inserted into the STM for announcements as well.

The steps of inserting sub-tree blocks (id, bm) into the STM are as follows. First, an id inquiry is made in the STM, and a corresponding bitmap B is returned (an all-zero bitmap is returned if the target is missed). Then, according to the withdrawal flag bit of the STM and the withdrawal flag bit of the bm, how to update B is determined. If the withdrawal flag bit of the STM is the same as the withdrawal flag bit of the bm (meaning that the target is hit and about to be withdrawn), B is updated by bm with a bitwise OR operation. If the withdrawal flags of the two are different (meaning missing the target), B is updated by a bit-wise AND operation with z, which is produced by reverting all bits of bm. Finally, the bitmap corresponding to the id is set to the updated B in the STM.

According to the above encoding scheme, a set of authorized IP prefixes of an AS may be encoded into N tuples (identifier, bitmap), where 1≤N. When the encoding function is implemented on the CA software, CA generates an ROA according to the STMa, the content of which includes an ASN and a list of sub-tree blocks, i.e., CA encapsulates N tuples (identifier, bitmap) and given AS into an ROA. When the encoding function is implemented on the RP software, RP generates N RTR payload PDUs according to the STMa, and each RTR payload PDU contains an ASN and a sub-tree block which represented by a tuple (identifier, bitmap).

It should be noted that if the set of authorized IP prefixes of an AS contains both IPv4 prefixes and the IPv6 prefixes, the above encoding process needs to be performed separately for IPv4 prefixes and IPv6 prefixes respectively.

Figure 3:
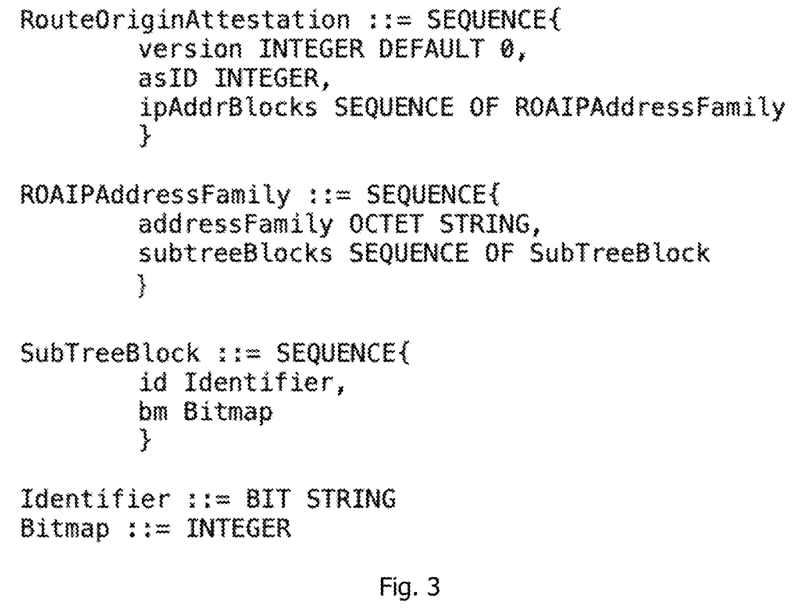
FIG. 3 is a diagram of an ASN.1 format of an ROA according to an embodiment of the application.

In order to integrate the encoding scheme into the existing RPKI system, this application extends the format of the ROA object. FIG. 3 shows an ASN.1 syntax of the ROA object. In traditional encoding scheme, the ROA object adopts a tuple<address, prefixLength, maxLength> to represent a IP address block, and means that one IP address blocks are authorized to an ASN, wherein address is encoded as a BIT STRING, prefixLength is encoded as an INTEGER and maxLength is encoded as an INTEGER and is optional. After applying our proposed encoding scheme, the ROA object adopts a tuple<identifier, bitmap> to represent a sub-tree block, wherein identifier is encoded as a BIT STRING and bitmap is encoded as an INTEGER and must exist.

Figure 4:
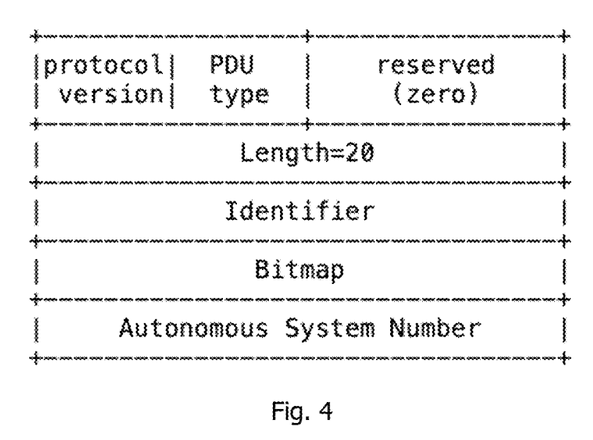
FIG. 4 is a diagram of a format of RTR IPv4 Prefix PDU according to an embodiment of the application.
Figure 5:
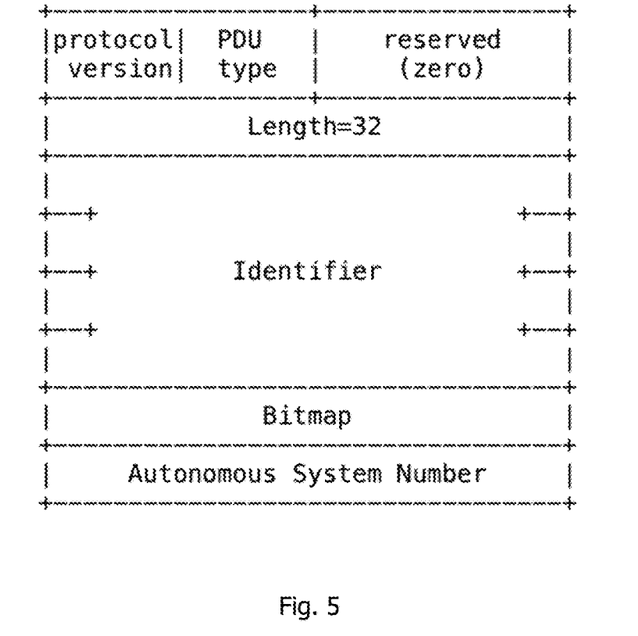
FIG. 5 is a diagram of a format of RTR IPv6 Prefix PDU according to an embodiment of the application.

The encoding scheme of this application may extend the RPKI-To-Router (RTR) protocol (a protocol used to transmit RPKI data between RPs and BGP routers), by defining two new types of RTR payload PDUs for IPv4 Prefix and IPv6 Prefix respectively. Therefore, based on the RTR protocol, RTR Prefix PDUs of type 12 and type 13 are defined. FIGS. 4 and 5 are diagrams of formats of an RTR IPv4 Prefix PDU (type 12) and an RTR IPv6 Prefix PDU (type 13) respectively. In the RTR IPv4 Prefix PDU, Flags field is replaced by Identifier and IPv4 Prefix field is replaced by Bitmap. In the RTR IPv6 Prefix PDU, the Flags field is replaced by Identifier and IPv6 Prefix is replaced by Bitmap.

Accordingly, the bitmap-based encoding system for ROAs comprises: a first processing unit configured to maintain a set of authorized IP prefixes of an AS with the IP address trie; a second processing unit configured to divide the IP address trie into a plurality of independent sub-tree blocks which do not overlap with one another, each sub-tree block being uniquely determined by the position of its root node in the original address trie; and a third processing unit configured to encode a path from the root node of the IP address trie to the root node of a sub-tree block into an integer, which is used as the unique identifier of this sub-tree block, and all prefixes covered by this sub-tree block into a bitmap. Thus, a set of authorized IP prefixes of a given AS can be encoded as several tuples (identifier, bitmap).

II. Bitmap-Based Decoding for ROAs

Given a sub-tree block (identifier, bitmap), the decoding function aims to decode it into a batch of authorized IP prefixes. The specific steps are as follows. The decoding function should be implemented on BGP routers, which perform decoding after a tuple (identifier, bitmap) is parsed from an RTR IPv4 Prefix PDU or an RTR IPv6 Prefix PDU.

First, the IP prefix x2/y2 represented by the root of the sub-tree block is decoded from the sub-tree identifier. According to our encoding scheme, y2 is actually the number of bits counted from the least significant bit (LSB) to the most significant set bit (MSB) of the sub-tree identifier. X2 can be made up by shifting the y bits ended by the LSB to the bit block starting from the MSB.

Then, a withdrawal flag, the least significant bit of the bitmap, and a set of authorized IP prefixes can be decoded from the bitmap. The position of every set bit (except the LSB) of the encoded sub-tree determines the node number of a node on this sub-tree, which in turn determines a prefix x1/y1. Its corresponding prefix x/y can be constructed by expanding the prefix x2/y2 corresponding to the root of this sub-tree, with all bits of the node number except the MSB (and correspondingly x1/y1). In particular, x is obtained by concatenating bit string x1 and x2, and y is obtained by adding y1 and y2.

Accordingly, a bitmap-based decoding system for ROA comprises: a first processing unit configured to extract sub-tree blocks in the RTR Prefix PDU one by one; a second processing unit configured to, for each sub-tree block, decode an IP prefix x2/y2 from the identifier which is representation of the root node of the sub-tree block, wherein y2 is the number of bits counted from the least significant bit (LSB) to the most significant set bit (MSB) of the identifier; x2 can be made up by shifting the y bits ended by the LSB to the bit block starting from the MSB; a third processing unit configured to, for each sub-tree block, extract the withdrawal flag bit from a bitmap and decode a set of authorized IP prefixes with it, each set bit in the bitmap corresponding to an authorized IP prefix except the flag bit, wherein the position of every set bit of the encoded sub-tree determines the node number of a node on this sub-tree, which in turn determines a prefix x1/y1; The prefix x/y can be constructed by concatenating bit string x1 and x2 into bit string x, and adding y1 and y2 into y; and a fourth processing unit configured to combine all authorized IP prefixes decoded above into an authorized prefix set.

III. STM-Based Maintenance for ROAs

The application maintains two STMs, STMa and STMw, for each AS to manage the announcement and withdrawal of ROAs. When the CA needs to authorize a set of IP prefixes to an AS, the CA first encodes these prefixes into multiple sub-tree blocks and maintains them with STMa. When the CA needs to withdraw all or part of the authorized IP prefixes of an AS, the CA first encodes these prefixes to be withdrawn into multiple sub-tree blocks and maintains them with STMw. It should be noted that the CA may announce or withdraw IP prefixes for an AS at the same time, and in this case, the CA encodes and maintains the announcements and withdrawals for ROAs based on STMa and STMw respectively.

When receiving announcements of ROAs, the RP may extract sub-tree blocks and insert them into the STMa corresponding to the authorized AS in ROA one by one. When receiving withdrawals of ROAs, the RP may extract sub-tree blocks and insert them into both STMa and STMw corresponding to the authorized AS in ROA one by one.

The application will be described in further detail below, still from three aspects: bitmap-based encoding for ROAs, bitmap-based decoding for ROAs, and STM-based maintenance for ROAs.

Figure 6:
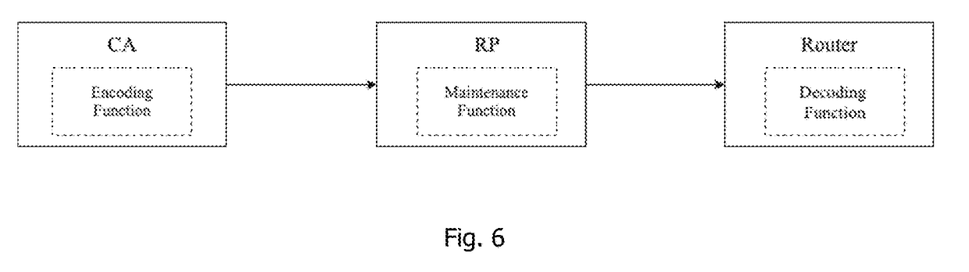
FIG. 6 is a diagram of a full implementation according to an embodiment of the application.
Figure 7:
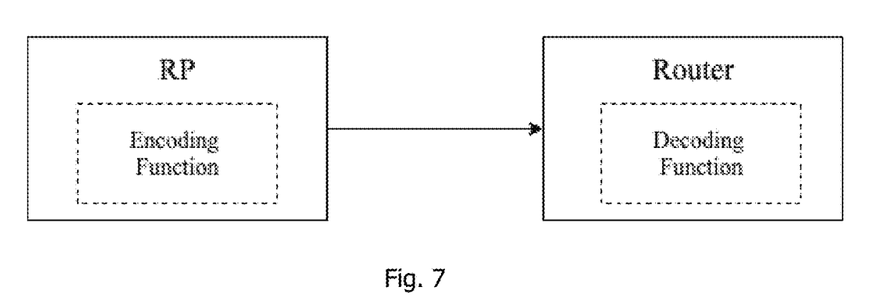
FIG. 7 is a diagram of a minimal implementation according to an embodiment of the application.

It should be noted that the encoding scheme of the embodiment of the application has two implementations, namely, the full implementation and the minimal implementation. Regarding the full implementation, CA software need to implement encoding function to encode a set of authorized IP prefixes of an AS, RP software need to implement maintenance function for ROAs, and BGP routers need to implement decoding function to decode a batch of prefixes from sub-tree blocks, as shown in FIG. 6. Regarding the minimal implementation, RP software need to implement encoding function to encode a set of authorized IP prefixes of an AS, and BGP routers need to implement decoding function to decode a set of IP prefixes of an AS, and the above three functions will be explained in details via specific embodiments.

I. Bitmap-Based Encoding for ROAs

Embodiment 1

Figure 8:
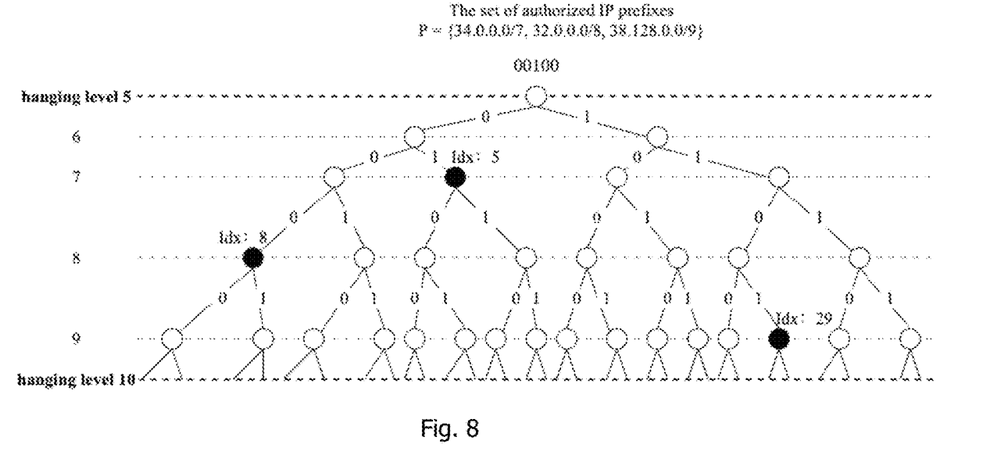
FIG. 8 is a diagram of a sub-tree block to be encoded (for announcement IP prefixes)

Assuming that a CA authorizes three IPv4 prefixes to AS111 as shown in FIG. 8, the AS obtains a set of authorized IP prefixes to be announced, for example, P={34.0.0.0/7, 32.0.0.0/8, 38.128.0.0/9}. The CA first initializes a STMa (assuming that the data structure of which is hash table) for AS 111, which is used to store one or more sub-tree blocks (in the form of tuple (identifier, bitmap)), wherein the key is identifier and the value is bitmap. In fact, the encoding unit is a single IP prefix and performed by the CA one by one.

In the IPv4 address trie, the level-5 and level-10 are two hanging levels. The prefix lengths of the above three IPv4 prefixes are 7, 8 and 9 respectively and the nearest hanging level is level-5 that these prefixes can hang to. Taking the authorized prefix 34.0.0.0/7 shown in FIG. 8 as an example, its binary representation is: 00100010 00000000 00000000 00000000, and the identifier of the sub-tree this prefix belongs to is made up by concatenating a set bit and the first 5 bits of 00100010 00000000 00000000 00000000, namely, 100100 (i.e., 36, and the leftmost bit 1 is used as the flag bit). Then, the middle 7−5=2 bits of this prefix ended by the $7^{th}$ bit, namely 01, are extracted and then appended to a set bit to make up node number 5 (101 in binary).

Based on the above encoding process, it can be concluded that authorized prefixes 32.0.0.0/8 and 38.128.0.0/9 are hanged on the same sub-tree as 34.0.0.0/7 does and the node number of them are 8 and 29, respectively. Therefore, the sub-tree block can be encoded as a bitmap: 00100000000000000000000100100000, wherein the withdrawal flag is set to "0", bit-5, bit-8 and bit-29 are set to "1", rest bits are set to "0", indicating that the above three IPv4 prefixes are authorized to be announced. Then, the CA inserts a sub-tree block (id=100100, bm=00100000000000000000000100100000) entry into the STMa, and the number of sub-tree block entries in this STMa is 1. At last, the CA encapsulates the sub-tree block entries (identifier, bitmap) of the STMa in the SubTreeBlock field of an ROA object, and sets the asID field to an integer of 111, and sends it to RPs via the rysnc/RRDP protocol.

Of course, when sub-trees are hanged on different hanging levels, encapsulation should be performed by different tuples.

Embodiment 2

Figure 9:
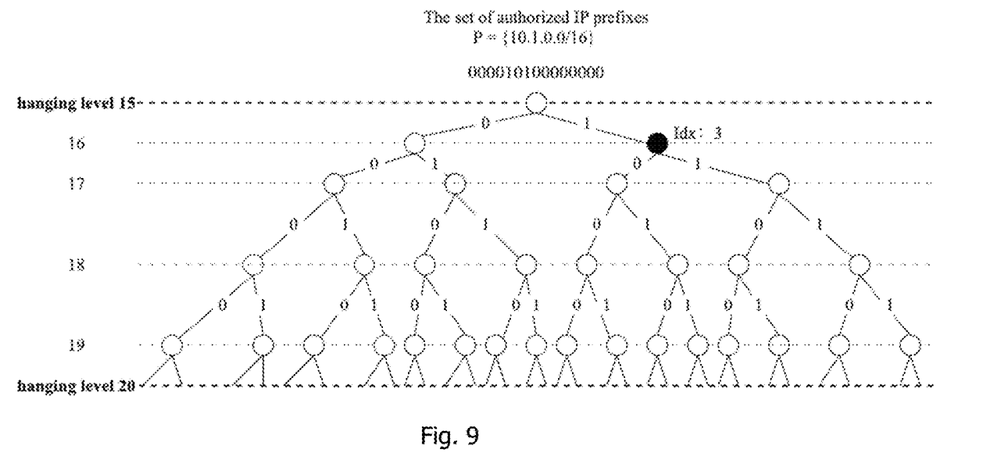
FIG. 9 is a diagram of a sub-tree block to be encoded (for announcement IP prefixes)

Assuming that a CA authorizes an IPv4 prefix to AS 222 as shown in FIG. 9, the AS obtains a set of authorized IP prefixes, namely, P={10.1.0.0/16}. The CA first initializes the STMa for AS 222. In the IPv4 address trie, the level-15 and level-20 are two hanging levels. The prefix length of the above IPv4 prefix is 16, and the nearest hanging level is level-15 this prefix can hang to.

For the IPv4 prefix 10.1.0.0/16, the first 16 bits obtained by the CA according to its IP address and prefix length are: 0000101000000000, the identifier of the sub-tree this prefix belongs to is made up by concatenating a set bit and the first 15 bits of 00001010 00000001 00000000 00000000 (10.1.0.0/16 in binary), namely, 1000010100000000. Then, the middle 16−15=1 bit of this prefix ended by the $16^{th}$ bit, namely 1, are extracted and then appended to a set bit to make up node number 3 (11 in binary). Therefore, the sub-tree block can be encoded as a bitmap: 00000000000000000000000000001000, wherein a withdrawal flag bit is set to "0", bit-3 is set to "1", and rest bits are set to "0", indicating that the above IPv4 prefix is authorized to be announced. The CA inserts a sub-tree block entry (id=10000101000000000, bm=00000000000000000000000000001000) into the STMa, and the number of sub-tree block entries in this STMa is 1. At last, the CA encapsulates entries (identifier, bitmap) of the STMa into the SubTreeBlock field of an ROA object, and sets the asID field to 222, and sends it to RPs via the rysnc/RRDP protocol.

Embodiment 3

Figure 10:
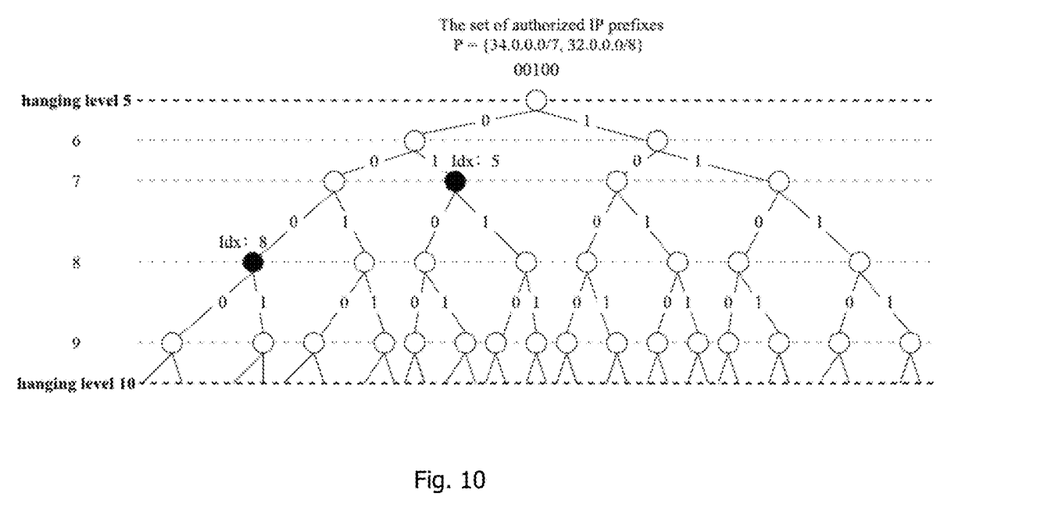
FIG. 10 is a diagram of a sub-tree block to be encoded (for withdrawal IP prefixes).

Assuming that the CA withdraws the authorization of two IPv4 prefixes of AS111 as shown in FIG. 10. The CA first initializes the STMw for AS111. The process of encoding these two IPv4 prefixes is basically the same as that in Embodiment 1, except that the withdrawal flag bit of the bitmap is set to "1", which indicates that the above two authorized IPv4 prefixes are to be withdrawn. Therefore, the CA inserts the sub-tree block entry (id=100100, bm=00000000000000000000000100100001) into the STMw. At last, the CA encapsulates entries of the STMw (identifier, bitmap) into the SubTreeBlock field of an ROA object, and sets the asID field to 111, and sends it to RPs via the rysnc/RRDP protocol.

II. STM-Based Maintenance for ROAs

Embodiment 1

Assuming that an RP receives an ROA object sent from a CA which contains sub-tree block entries corresponding to the set of authorized IP prefixes in FIG. 8. First, the RP extracts the asID field of the ROA object, namely, 111. When it is found that STMs do not exist for AS111, the RP initializes two STMs for AS111, a STMa and a STMw, and the contents of both STMs are empty. Then, the RP extracts the SubTreeBlock field in the ROA object, and finds that there is only one entry (id=100100, bm=00100000000000000000000100100000). According to the withdrawal flag bit (0) of the bitmap, it can be known that these authorized IP prefixes in the sub-tree block are announcements, so this sub-tree block entry should be inserted into the STMa.

The specific insertion process is as follows. First, the RP searches an encoded sub-tree (bitmap) in the STMa by the sub-tree identifier (id=100100), and returns a corresponding bitmap B obtained if search succeeds (an all-zero bitmap is returned if the target is missed). Because the encoded sub-tree (bm) contained in the inserting block has the same withdrawal flag as the STMa, B(00000000000000000000000000000000) is updated by bm(00100000000000000000000100100000) with bit-wise OR operation. Then, the bitmap corresponding to id=100100 is set to the updated B=00100000000000000000000100100000 in the STMa of AS111. At last, the RP generates an RTR IPv4 Prefix PDU with the type field set to 12, the identifier field set to 00000000000000000000000000100100, the bitmap field set to 00100000000000000000000100100000, and the ASN field set to 111, and sends it to BGP routers via the RTR protocol.

Embodiment 2

Assuming that an RP receives an ROA object sent from a CA which contains sub-tree block entries corresponding to the set of authorized IP prefixes as shown in FIG. 9. First, the RP extracts the asID field of the ROA object, namely, 222. When it is found that STMs do not exist for AS222, the RP initializes two STMs, a STMa and a STMw, and the contents of both STMs are empty. Then, the RP extracts the SubTreeBlock field of the ROA object, and finds that there is only one entry (1000010100000000, 0000000000000000000000000001000). According to the withdrawal flag bit (0) of the bitmap, it can be known that these authorized IP prefixes in this sub-tree block are announcements, so this sub-tree block entry should be inserted into the STMa.

The specific insertion process is as follows. First, the RP searches an encoded sub-tree(bitmap) in STMa by the sub-tree identifier (1000010100000000), and a corresponding bitmap B is obtained if search succeeds (an all-zero bitmap is returned if the target is missed). Because the encoded sub-tree (bm) contained in the inserting block has the same withdrawal flag as STMa, B(00000000000000000000000000000000) is updated by bm(00000000000000000000000000001000) with bit-wise OR operation. Then, the bitmap corresponding to id=1000010100000000 is set to the updated B=00000000000000000000000000001000 in STMa of AS222. At last, the RP generates an RTR IPv4 Prefix PDU with the PDU type set to 12, the identifier field set to 00000000000000000000000000100100, the bitmap field set to 00100000000000000000000100100000, and the ASN field set to 222, and sends it to BGP routers via the RTR protocol.

Embodiment 3

Assuming that an RP receives an ROA object sent from a CA which contains sub-tree block entries corresponding to the set of authorized IP prefixes as shown in FIG. 10. First, the RP extracts the asID field of the ROA object, namely, 111, and it is found that two STMs, STMa and STMw, have been maintained locally for AS111. The significance of maintaining two STMs is that they can respond to two kinds of queries sent by BGP routers, namely, serial queries and reset queries. The STMa is used to respond to reset queries, and STMa and STMw are used to respond to serial queries.

Then, the RP extracts the SubTreeBlock field of the ROA object, and finds that there is only one sub-tree block entry (id=100100, bm=00000000000000000000000100100001). According to the withdrawal flag bit (1) of the bitmap, it can be known that these authorized IP prefixes in this sub-tree block are authorized to be withdrawn, so this sub-tree block entry should be inserted into both STMa and STMw.

The specific process of inserting this sub-tree block into the STMa is as follows. First, the RP searches an encoded sub-tree(bitmap) in the STMa by the sub-tree identifier (100100), and a corresponding bitmap B (00100000000000000000000100100000) is obtained. Because the encoded sub-tree (bm) contained in the inserting block has the different withdrawal flag as STMa, B(00100000000000000000000100100000) is updated by a bit-wise AND operation with 11111111111111111111111011011110, which is produced by reverting all bits of bm(00000000000000000000000100100001). Then, the bitmap corresponding to id(100100) is set to the updated B=00100000000000000000000000000000 in the STMa of AS111, indicating that IP prefix whose index value of bitmap is 29 is still in the authorized state.

The specific process of inserting the sub-tree block into the STMw is as follows. First, the RP searches an encoded sub-tree(bitmap) in the STMw by the sub-tree identifier (100100), and a corresponding bitmap B is obtained if search succeeds (an all-zero bitmap is returned if the target is missed). Because the encoded sub-tree (bm) contained in the inserting block has the same withdrawal flag as STMw, B(00000000000000000000000000000000) is updated by bm(00000000000000000000000100100001) with a bit-wise OR operation. Then, the bitmap corresponding to id=100100 is set to the updated B=00000000000000000000000100100001 in the STMw. The bitmap indicates that authorized IP prefixes whose index values of bitmap are 5 and 8 should be withdrawn.

At last, the RP generates an RTR IPv4 Prefix PDU with the type field set to 12, the identifier field set to 00000000000000000000000000100100, the bitmap field set to 00100000000000000000000000000000, and the ASN field set to 111, and sends it to BGP routers via the RTR protocol.

III. The Bitmap-Based Decoding for ROAs

Embodiment 1

When receiving an RTR IPv4 Prefix PDU sent by the RP in Embodiment 1 of III, the BGP router extracts a tuple (identifier=00000000000000000000000000100100, bitmap=00100000000000000000000100100000) from it and then decodes a batch of authorized prefixes with it.

First, the BGP router decodes the IP prefix x/y represented by the root of this sub-tree block from the sub-tree identifier. If the binary representation (00000000000000000000000000100100) of the identifier is counted from LSB to most significant set bit of the sub-tree identifier, x can be made up by shifting the 00100 ended by the LSB to the bit block starting from the MSB, namely, 00100000 00000000 00000000 00000000.

Then, a withdrawal flag bit "0" may be parsed by the BGP router from the bitmap=00100000000000000000000100100000 and a set of authorized IP prefixes may be decoded. The position of every set bit (except the withdrawal flag) of the encoded sub-tree determines the node number of a node on this sub-tree. Then, its corresponding prefix can be constructed by expanding the prefix corresponding to the root of this sub-tree, with all bits of the node number except the MSB. Taking the bit-5 as an example, the node number of the node on this sub-tree is 5(101 in binary), and its corresponding prefix is constructed by concatenating 00100 (first 5 bits of the prefix represented by the root of this sub-tree) and 01 (removing the MSB of the node number in binary), namely, 0010001000000000000000000000000(34.0.0.0/7), and the prefix length is 5+2=7. According to the same decoding process, authorized IP prefixes 32.0.0.0/8 and 38.128.0.0/9 can be decoded from the set bit-8 and bit-29 in the bitmap.

It should be noted that when the encoding/decoding scheme adopts the minimum implementation, that is, the RP implements the encoding function for ROAs, and the BGP router implements the decoding function for ROAs, this process does not involve the STM-based maintenance for ROAs. When the RTR payload PDU is received which contains a sub-tree block for withdrawal, N authorized IP prefixes and an ASN can be decoded from it, and BGP routers should delete N tuples (IP prefix, ASN) from its locally maintained IP prefix-ASN mapping database.

The embodiments of the application not only achieve strong security like the minimal ROA, but also improves system scalability, realizing a secure and scalable encoding for ROAs.

Obviously, there are many variations of the application described here without departing from the true spirit and scope of this application. While successive hanging levels for one IP address trie have the same distance therebetween, the distance can be set flexibly for different IP tries, such as 6, 7, etc., instead of being limited to 5. However, it is necessary to adapt the bit-wise operation according to the specific setting (computer machines generally support 64-bit operation, and if the bitmap exceeds 64 bits, segmentation operation should be considered). Further, the distances between successive hanging levels may also be flexible, which may lead to the above bit operation problem. In addition, formats of the ROA object and the RTR payload PDU should be adjusted as needed.

Therefore, all changes obvious to those skilled in the art should be included in the scope covered by the claims. The protection scope of the application is limited only by the appended claims.

What is claimed is:

1. A method for Route Origin Authorizations (ROAs), comprising:
    obtaining a set of Internet Protocol (IP) prefixes, the set of IP prefixes comprising at least one IP prefix authorized to an Autonomous System (AS);
    determining a Route Origin Authorization (ROA) of the AS according to the at least one IP prefix, the ROA comprising a tuple (identifier, bitmap), wherein an IP address trie is used to maintain the at least one IP prefix, the at least one IP prefix respectively corresponds to root nodes of at least one sub-tree block of the IP address trie, the at least one sub-tree block being at least one of a plurality of sub-tree blocks which do not overlap with one another and are each uniquely determined by the position of its root node in the IP address trie, the identifier represents the path from the root node of the at least one sub-tree block to the root node of the IP address trie, the bitmap represents authorized status of the nodes of the at least one sub-tree block, and the encoding of at least one valid bit of the bitmap indicating that a root node of a sub-tree block corresponding to the valid bit is an authorized node; and
    sending the ROA.

2. The method according to claim 1, wherein the method comprises:
    dividing the IP address trie into a plurality of sub-trees by specifying a sequence of hanging levels on the IP address trie, each rooted at a hanging level; and
    wherein a subtree rooted at the hanging level i and terminates at the next hanging level j or the last level k has a height j−i or k−i.

3. The method according to claim 1, wherein
    a sub-tree block X, and an IP prefix corresponding to a node of the sub-tree block X is x/y, wherein x represents an IP address and y represents a prefix length, the IP prefix is encoded into a (m+1)-bit integer and as the identifier of the sub-tree block, by concatenating a set bit and the first m bits of the IP prefix; and
    encoding the sub-tree block X as the bitmap of a $2^m$ bits and a bit of the bitmap, number of which bit can be located by the remaining y-m bits of the IP prefix, is set, wherein m is the height of this sub-tree.

4. The method according to claim 1, wherein the bitmap comprises a flag bit to identify whether the corresponding sub-tree block is used for announcement or withdrawal.

5. The method according to claim 1, further comprising:
    for a sub-tree block (identifier, bitmap), performing a search for the identifier of the sub-tree block in the Sub-Tree Map (STM), and returning a corresponding bitmap B;
    then, according to a withdrawal flag bit of the STM and a withdrawal flag bit of the corresponding bitmap B, determining how to update B;
    if the withdrawal flag bit of the STM is the same as the withdrawal flag bit of the corresponding bitmap B, updating B with a bit-wise OR operation;
    if the withdrawal flag bits of the STM and corresponding bitmap B are different, updating B by the bit-wise AND operation with z, which is produced by reverting all bits of the correspond bitmap B; and
    setting the bitmap corresponding to the identifier of the sub-tree block to the updated B in the STM.

6. The method according to claim 1, further comprising:
    maintaining two Sub-Tree Maps (STMa and STMw), one of the two Sub-Tree Maps (STMa) for announcement and another of the two Sub-Tree Maps (STMw) for withdrawal of authorized IP prefixes for each AS.

7. The method according to claim 1, further comprising:
    implementing the method by Certification Authority software, and
    sending the ROAs comprises: encapsulating the plurality of sub-tree blocks in an ROA object.

8. The method according to claim 1, further comprising:
    implementing the method by Replying Party (RP) software, and
    sending the ROAs comprises: encapsulating sub-tree blocks into RPKI-To-Router (RTR) payload Protocol Data Units (PDUs) respectively.

9. A method for Route Origin Authorizations (ROAs), comprising:
    obtaining a Route Origin Authorization (ROA) object which contains at least one sub-tree block represented by a tuple of identifier and bitmap, wherein the at least one sub-tree block is at least one of a plurality of sub-tree blocks of an IP address trie which do not overlap with one another and are each uniquely determined by a position of its root node in the IP address trie, the identifier represents the path from the root nodes of the at least one sub-tree block to the root node of the IP address trie, the bitmaps represent authorized status of the nodes of the IP address trie including the nodes of the at least one sub-tree block, and encoding of at least one valid bit of the bitmap indicating that a root node of a sub-tree block corresponding to a valid bit is an authorized node;

extracting at least one tuple of identifier and bitmap from the ROA object; and decoding at least one IP prefix according to the extracted at least one tuple of identifier and bitmap, and determining a number of the at least one IP prefix by a number of authorized nodes in the bitmap, wherein the at least one IP prefix respectively corresponds to the root nodes of the at least one sub-tree block of the IP address trie.

10. The method according to claim 9, comprising:

for each sub-tree block in the at least one sub-tree block, decoding an IP prefix x2/ y2 from the identifier which is representation of the root node of the sub-tree block, wherein y2 is the number of bits counted from the least significant bit (LSB) to the most significant set bit (MSB) of the identifier and x2 is obtained by shifting the bits ended by the LSB to the bit block starting from the MSB;

for the each sub-tree block in the at least one sub-tree block, extracting a withdrawal flag bit from the bitmap and decoding a set of authorized IP prefixes with the withdrawal flag bit, each set bit in the bitmap corresponding to an authorized IP prefix;

wherein a position of every set bit of an encoded sub-tree determines a node number of a node on the encoded sub-tree, which in turn determines a prefix x1/y1, wherein the prefix x/y is constructed by concatenating bit string x1 and x2 into bit string x, and adding y1 and y2 into y; and combining the authorized IP prefix into an authorized prefix set.

* * * * *